(12) United States Patent
Song et al.

(10) Patent No.: US 11,971,582 B2
(45) Date of Patent: Apr. 30, 2024

(54) OPTICAL FIBER ADAPTER

(71) Applicant: SUNCALL TECHNOLOGIES (SZ) CO., LTD, Shenzhen (CN)

(72) Inventors: Hongbin Song, Shenzhen (CN); Xiaohui Liu, Shenzhen (CN); Masaya Nakagawa, Shenzhen (CN)

(73) Assignee: SUNCALL TECHNOLOGIES (SZ) CO., LTD, Shenzhen (CN)

( * ) Notice: Subject to any disclaimer, the term of this patent is extended or adjusted under 35 U.S.C. 154(b) by 383 days.

(21) Appl. No.: 17/278,246

(22) PCT Filed: Sep. 20, 2019

(86) PCT No.: PCT/CN2019/107049
§ 371 (c)(1),
(2) Date: Mar. 19, 2021

(87) PCT Pub. No.: WO2020/057643
PCT Pub. Date: Mar. 26, 2020

(65) Prior Publication Data
US 2021/0373249 A1  Dec. 2, 2021

(30) Foreign Application Priority Data
Sep. 21, 2018 (CN) .......................... 201811108938.X

(51) Int. Cl.
*G02B 6/38* (2006.01)
(52) U.S. Cl.
CPC .................. *G02B 6/3825* (2013.01)
(58) Field of Classification Search
CPC ....................................................... G02B 6/38
(Continued)

(56) References Cited

U.S. PATENT DOCUMENTS 4,840,451 A * 6/1989 Sampson ............. G02B 6/4292
385/88
5,118,925 A * 6/1992 Mims .................... H01J 29/867
174/382

(Continued)

FOREIGN PATENT DOCUMENTS

CN        1719294 A     1/2006
CN      101105556 A     1/2008
(Continued)

OTHER PUBLICATIONS

International Search Report for Application No. PCT/CN2019/107049 dated Nov. 14, 2019.

*Primary Examiner* — Kaveh C Kianni
(74) *Attorney, Agent, or Firm* — Suiter Swantz IP

(57) ABSTRACT

Provided is an optical fiber adapter. The optical fiber adapter includes an adapter body, a shielding gate, a sleeve, and an elastic shield. One side wall of the adapter body is provided with a long groove. The shielding gate is disposed at a lower port of the adapter body. The shielding gate includes one end connected to the lower port of the adapter body and one end facing away from the lower port of the adapter body. The sleeve is sleeved on a periphery of a lower end portion of the adapter body. The elastic shield is disposed in the long groove. The elastic shield is fitted with one end portion of the shielding gate facing toward the elastic shield. The shielding gate, the sleeve, and the elastic shield form an anti-light-leakage cavity on an optical fiber access side of the optical fiber adapter.

19 Claims, 3 Drawing Sheets

(58) Field of Classification Search
USPC .......................................................... 385/134
See application file for complete search history.

(56) References Cited

U.S. PATENT DOCUMENTS

| | | | |
|---|---|---|---|
| 6,349,164 B1* | 2/2002 | Mair | G02B 6/3897 385/56 |
| 7,211,739 B1* | 5/2007 | Brigham, Jr. | H05K 9/0058 439/607.17 |
| 7,329,053 B2 | 2/2008 | Sohmura et al. | |
| 7,507,032 B2 | 3/2009 | Katagiyama et al. | |
| 8,936,400 B2 | 1/2015 | Jibiki et al. | |
| 9,153,898 B2* | 10/2015 | Dendas | H01R 13/6581 |
| 9,196,997 B2 | 11/2015 | Sanders et al. | |
| 10,241,288 B2 | 3/2019 | He | |
| 2003/0026552 A1* | 2/2003 | Goode | G02B 6/4257 385/88 |
| 2003/0169978 A1* | 9/2003 | Sato | G02B 6/3846 385/88 |
| 2007/0179554 A1* | 8/2007 | Iyer | A61N 1/3754 607/37 |
| 2009/0305575 A1* | 12/2009 | Lin | H01R 13/659 439/676 |
| 2015/0110444 A1* | 4/2015 | Tanaka | G02B 6/3817 385/75 |
| 2017/0254973 A1* | 9/2017 | Yu | H01R 13/6581 |

FOREIGN PATENT DOCUMENTS

| | | |
|---|---|---|
| CN | 102346280 A | 2/2012 |
| CN | 103018844 A | 4/2013 |
| CN | 103930812 A | 7/2014 |
| CN | 204215066 U | 3/2015 |
| CN | 104656212 A | 5/2015 |
| CN | 204758872 U | 11/2015 |
| CN | 107329213 A | 11/2017 |
| CN | 207675983 U | 7/2018 |
| CN | 108957643 A | 12/2018 |
| JP | 2006/003468 A | 1/2006 |
| WO | WO 2013/042000 A1 | 3/2013 |

* cited by examiner

OPTICAL FIBER ADAPTER

CROSS-REFERENCE TO RELATED APPLICATION

This application is a U.S. National Stage Application of PCT Application Serial No. PCT/CN2019/107049, filed Sep. 20, 2019, which claims priority to Chinese Patent Application No. 201811108938.X filed Sep. 21, 2018, the disclosures of which are incorporated herein by reference in their entireties.

TECHNICAL FIELD

The present disclosure relates to the technical field of connectors, in particular, an optical fiber adapter.

BACKGROUND

In the existing fiber optic adapter, when the high-intensity infrared beam of an optical fiber is emitted from one end of the optical fiber adapter, damage may be caused to eyesight if an operator's eyes are directly exposed to the beam accidentally. Moreover, due to the exposure of the optical fiber, the dust may easily fall into the optical fiber, which affects the stability of the optical fiber after the optical fiber is connected.

SUMMARY

The present disclosure provides an optical fiber adapter. The optical fiber adapter includes an adapter body, a shielding gate, a sleeve, and an elastic shield. One side wall of the adapter body is provided with a long groove. The shielding gate is disposed at a lower port of the adapter body. The shielding gate includes one end connected to the lower port of the adapter body and one end facing away from the lower port of the adapter body. The sleeve is sleeved on a periphery of a lower end portion of the adapter body. The elastic shield is disposed in the long groove. The elastic shield is fitted with one end portion of the shielding gate facing toward the elastic shield. The shielding gate, the sleeve, and the elastic shield form an anti-light-leakage cavity on an optical fiber access side of the optical fiber adapter.

Two shielding gates are provided. The two shielding gates are disposed at the lower port of the adapter body, and the two shielding gates are elastically hinged to one side wall of the adapter body provided with the long groove and one side wall of the adapter body opposite to the one side wall of the adapter body provided with the long groove. One end of one of the two shielding gates facing away from the lower port of the adapter body overlaps with one end of another one of the two shielding gates facing away from the lower port of the adapter body so that an overlapping portion is formed, and one end surface of the overlapping portion is located on a side where the one side wall of the adapter body provided with the long groove is located.

A slideway is provided between the long groove and the sleeve, and the elastic shield is slidably fitted with the slideway along a length direction of the long groove.

An inner side surface of a lower end of the elastic shield is protrudingly provided with a flange that is fitted with a lower bottom surface of the overlapping portion of the two shielding gates, and the elastic shield is capable of driving the two shielding gates to slide through the flange.

The elastic shield includes a shielding block and a compression spring. A positioning column is provided between two adjacent side walls of the shielding block. A lower end of the compression spring is sleeved on the positioning column. A lower end surface of the shielding block is provided with an arc-shaped groove that is fitted with an optical fiber connector joint.

An upper end of the long groove is provided with a positioning groove, and an upper end of the compression spring is inserted into the positioning groove.

The elastic shield includes a limiting torsion spring and a shielding arm. The one side wall at the lower end portion of the adapter body provided with the long groove is further provided with an accommodation groove capable of accommodating the limiting torsion spring. One end of the limiting torsion spring is elastically hinged to one side wall of the long groove, and another end of the limiting torsion spring abuts against the shielding arm. One end of the shielding arm is hinged to a bottom of the accommodation groove, and another end of the shielding arm abuts against the other side wall of the long groove.

An inner side surface of the elastic shield is slidably fitted with the one end surface of the overlapping portion of the two shielding gates.

The one side wall at the lower end portion of the adapter body provided with the long groove and a lower end of the one side wall of the adapter body opposite to the one side wall of the adapter body provided with the long groove are respectively horizontally penetrated so that a clamping slot is formed. The clamping slot is clamped to a hinge shaft of the shielding gate. A torsion spring is sleeved on the middle of the hinge shaft of the shielding gate.

The clamping slot includes a clamping position and a clamping position entrance portion connected to the clamping position in a penetrating manner, and a spacing of the clamping position entrance portion is less than an inner diameter of the clamping position.

The present disclosure provides an optical fiber adapter. The optical fiber adapter includes an adapter body, a shielding gate, a sleeve, and an elastic shield. One side wall of the adapter body is provided with a long groove. The shielding gate is disposed at a lower port of the adapter body. The shielding gate includes one end connected to the lower port of the adapter body and one end facing away from the lower port of the adapter body. The sleeve is sleeved on a periphery of a lower end portion of the adapter body. The elastic shield is disposed in the long groove. The elastic shield is fitted with one end portion of the shielding gate facing toward the elastic shield. The shielding gate, the sleeve, and the elastic shield form an anti-light-leakage cavity on an optical fiber access side of the optical fiber adapter. With this structural design, the anti-light-leakage cavity is formed on the optical fiber access side of the optical fiber adapter through the cooperation between the elastic shield, the sleeve, and the shielding gate. In this manner, after an optical fiber is connected to one end of the optical fiber adapter, light leakage from the other end of the optical fiber adapter can be effectively prevented, and thus a better anti-light-leakage and dust-proof effect can be achieved.

DETAILED DESCRIPTION

The solutions of the present disclosure are described hereinafter through embodiments in conjunction with drawings.

Embodiment 1

Figure 1:
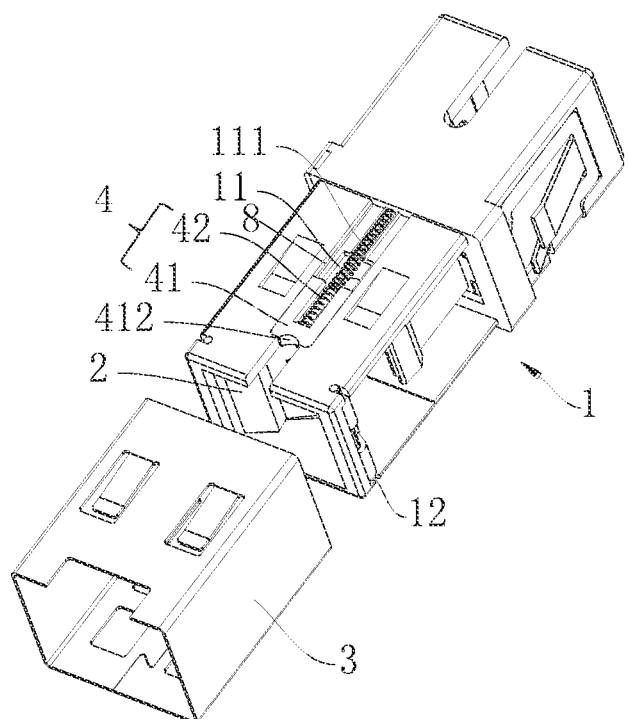
FIG. 1 is an exploded view of an optical fiber adapter according to embodiment 1 of the present disclosure.
Figure 2:
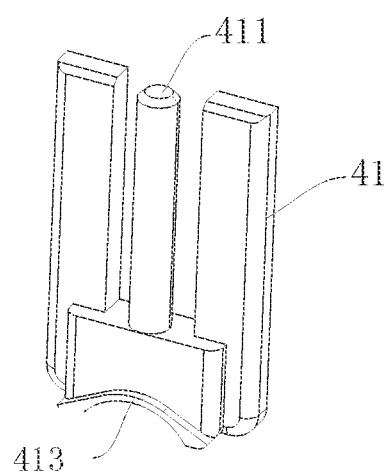
FIG. 2 is an axonometric drawing of a shielding block of FIG. 1.
Figure 3:
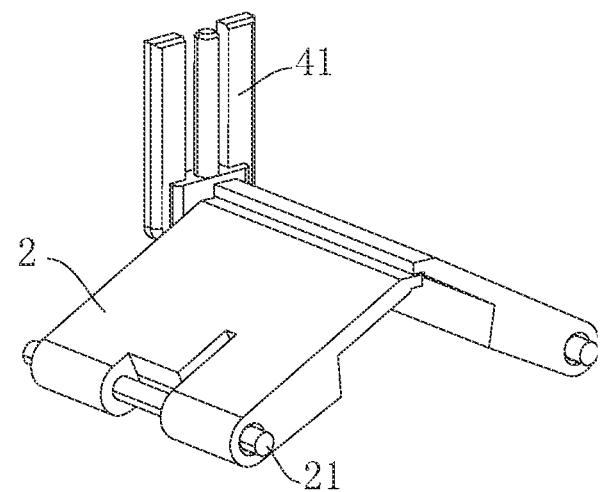
FIG. 3 is an axonometric drawing of a shielding gate and the shielding block of FIG. 1 after the shielding gate is fitted with the shielding block.

As shown in FIGS. 1 to 3, this embodiment provides an optical fiber adapter. The optical fiber adapter includes an adapter body 1, a shielding gate 2, a sleeve 3, and an elastic shield 4. One side wall of the adapter body 1 is provided with a long groove 11. The shielding gate 2 is disposed at a lower port of the adapter body 1. The shielding gate 2 includes one end connected to the lower port of the adapter body 1 and one end facing away from the lower port of the adapter body 1. The sleeve 3 is sleeved on a periphery of a lower end portion of the adapter body 1. The elastic shield 4 is disposed in the long groove 11. The elastic shield 4 is fitted with an end portion of the shielding gate 2 facing toward the elastic shield 4 (that is, one end facing away from the lower port of the adapter body 1). The shielding gate 2, the sleeve 3, and the elastic shield 4 form an anti-light-leakage cavity on an optical fiber access side of the optical fiber adapter.

In the optical fiber adapter designed by adopting the preceding manner, before an optical fiber connector joint is inserted, the lower port of the adapter body 1 is always closed and opaque due to the effect of the shielding gate 2 and the elastic shield 4. In this manner, after an optical fiber is connected to the optical fiber access side of the optical fiber adapter, light leakage from another side of the optical fiber adapter can be effectively prevented, and thus a better anti-light-leakage and dust-proof effect can be achieved.

In this embodiment, two shielding gates are provided. The two shielding gates are disposed at the lower port of the adapter body 1, and the two shielding gates are elastically hinged to one side wall of the adapter body 1 provided with the long groove 11 and one side wall of the adapter body 1 opposite to the one side wall of the adapter body 1 provided with the long groove 11, respectively. One end of one of the two shielding gates 2 facing away from the lower port of the adapter body 1 overlaps with one end of another of the two shielding gates 2 facing away from the lower port of the adapter body 1 so that an overlapping portion is formed. One end surface of the overlapping portion of the two shielding gates 2 is located on a side where the one side wall of the adapter body 1 provided with the long groove 11 is located, and another end surface of the overlapping portion of the two shielding gates 2 is bonded to slidably disposed with one inner wall of a cavity of the adapter body 1 (that is, an inner side of the one side wall of the adapter body 1 opposite to the one side wall of the adapter body 1 provided with the long groove 11).

A slideway is provided between the long groove 11 and the sleeve 3, and the elastic shield 4 is slidably fitted with the slideway along a length direction of the long groove 11. In this embodiment, the elastic shield 4 includes a shielding block 41 and a compression spring 42. A positioning column 411 is provided between two adjacent side walls of the shielding block 41. A lower end surface of the shielding block 41 is provided with an arc-shaped groove 412 that is fitted with the optical fiber connector joint. An upper end of the long groove 11 is provided with a positioning groove 111. An upper end of the compression spring 42 is inserted into the positioning groove 111, and a lower end of the compression spring 42 is sleeved on the positioning column 411. In this embodiment, since the width of the shielding block 41 is greater than the width of the long groove 11, the shielding block 41 can be limited by a step 8 formed between the slideway fitted with the shielding block 41 and the long groove 11.

In this embodiment, an inner side surface of a lower end of the elastic shield 4 is slidably fitted with end surfaces of the two shielding gates 2. To make the shielding block 41 of the elastic shield 4 closely bonded to the end surfaces of the two shielding gates 2 facing toward the shielding block 41 and prevent light leakage from the long groove 11, the inner side surface of the lower end of the elastic shield 4 is protrudingly provided with a flange 413 that is fitted with a lower bottom surface of the overlapping portion of the two shielding gates 2, and the elastic shield 4 may drive the two shielding gates 2 to slide through the flange 413. In the initial state, one end of the overlapping portion of the two closed shielding gates 2 is laid on the flange 413, and another end of the overlapping portion of the two shielding gates 2 is bonded to an inner wall of the lower port of the adapter body 1.

Furthermore, to further prevent light leakage from the long groove 11, in this embodiment, the sleeve 3 is sleeved on a periphery of the lower end portion of the adapter body 1, and the sleeve 3 is clamped to an outer side wall of the lower end portion of the adapter body 1. The sleeve 3 is sleeved on the periphery of the lower end portion of the adapter body 1 such that anti-light-leakage cavity can be formed on the optical fiber access side of the optical fiber adapter. In this manner, after the optical fiber is connected to one end of the optical fiber adapter, light leakage from another end of the optical fiber adapter can be effectively prevented, and thus a better anti-light-leakage and dust-proof effect can be achieved.

Figure 5:
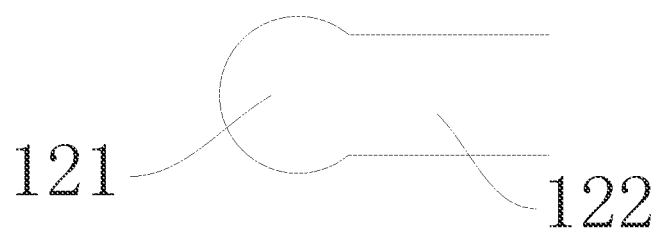
FIG. 5 is a sectional view of a clamping slot of FIGS. 1 and 3.

As shown in FIG. 5, the one side wall at the lower end portion of the adapter body 1 provided with the long groove 11 and a lower end of the one side wall of the adapter body 1 opposite to the one side wall of the adapter body 1 provided with the long groove 11 are respectively horizontally penetrated so that a clamping slot 12 is formed. The clamping slot 12 is clamped to a hinge shaft 21 of the shielding gate 2. A torsion spring is sleeved on the middle of the hinge shaft 21 of the shielding gate 2. The clamping slot 12 includes a clamping position 121 and a clamping position entrance portion 122 connected to the clamping position 121 in a penetrating manner. The spacing of the clamping position entrance portion 122 is less than the inner diameter of the clamping position 121. With this structural design, the hinge shaft 21 is pushed into the clamping position 121 along the clamping position entrance portion 122, and thus the hinge shaft 21 may be quickly fixed, which saves time and effort, and is stable and reliable.

With the preceding design, before the optical fiber connector joint is inserted, the lower port of the adapter body 1 is always in a closed state due to the effect of the compression spring 42 and the torsion spring at the shielding gate 2. In this manner, the following cases can be effectively avoided: after an optical fiber is connected to one end of the optical fiber adapter, light may be leaked out of another end of the optical fiber adapter; due to the exposure of the optical fiber, the dust may fall into the optical fiber. Therefore, a better anti-light-leakage and dust-proof effect can be achieved.

Embodiment 2

Figure 4:
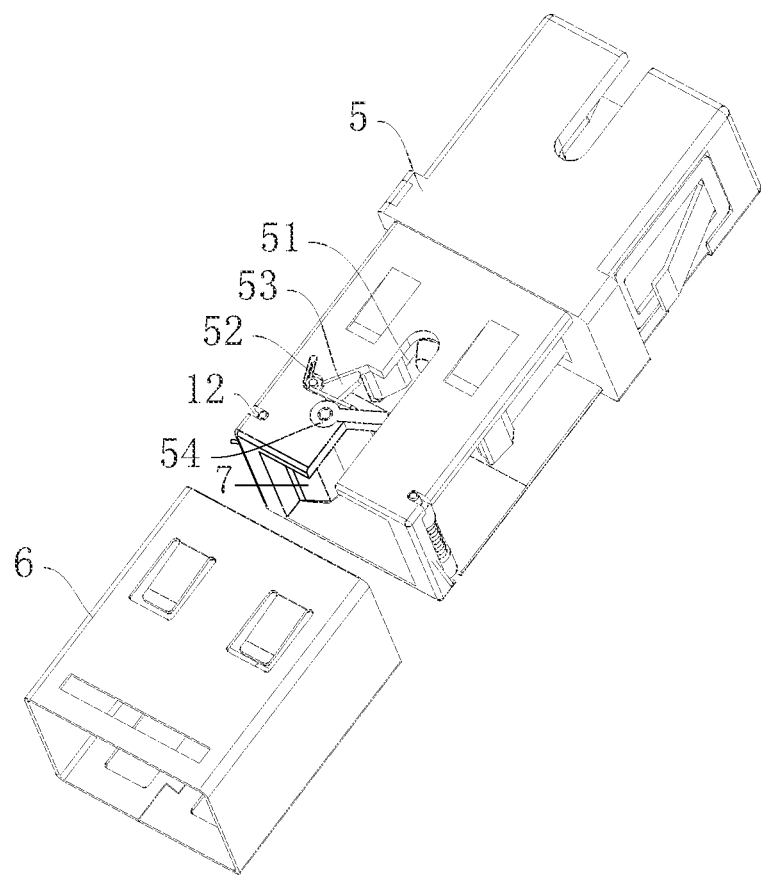
FIG. 4 is an exploded view of an optical fiber adapter according to embodiment 2 of the present disclosure.

As shown in FIG. 4, the main difference between this embodiment and the preceding embodiment 1 is that one end of the elastic shield is elastically hinged to one side wall of a long groove 51, and another end of the elastic shield abuts against another side wall of the long groove 51.

The elastic shield includes a limiting torsion spring 52 and a shielding arm 54. One end of the limiting torsion spring 52 is elastically hinged to one side wall of the long groove 51, and another end of the limiting torsion spring 52 abuts against the shielding arm 54. One side wall at a lower end portion of an adapter body 5 provided with the long groove 51 is further provided with an accommodation groove 53 capable of accommodating the limiting torsion spring 52. One end of the shielding arm 54 is hinged to a bottom of the accommodation groove 53, and another end of the shielding arm 54 abuts against the other side wall of the long groove 51. Under the force of the limiting torsion spring 52, the shielding arm 54 is obliquely disposed in the long groove 51 and an inner side wall of the shielding arm 54 is bonded to one end surface of an overlapping portion of two closed shielding gates 7. Furthermore, a sleeve 6 is sleeved on a periphery of the lower end portion of the adapter body 5 such that an anti-light-leakage cavity may be formed on an optical fiber access side of the optical fiber adapter. In this manner, after the optical fiber is connected to one end of an optical fiber adapter, light leakage from another end of the optical fiber adapter can be effectively prevented, and thus a better anti-light-leakage and dust-proof effect can be achieved.

What is claimed is:

1. An optical fiber adapter, comprising an adapter body, a shielding gate, a sleeve, and an elastic shield, wherein
   one side wall of the adapter body comprises a long groove;
   the shielding gate is disposed at a lower port of the adapter body, and the shielding gate comprises one end connected to the lower port of the adapter body and one end facing away from the lower port of the adapter body;
   the sleeve is sleeved on a periphery of a lower end portion of the adapter body; and
   the elastic shield is disposed in the long groove, and the elastic shield is fitted with one end portion of the shielding gate facing toward the elastic shield,
   wherein the shielding gate, the sleeve, and the elastic shield form an anti-light-leakage cavity on an optical fiber access side of the optical fiber adapter; and
   wherein the elastic shield comprises a shielding block and a compression spring, a positioning column is provided between two adjacent side walls of the shielding block, a lower end of the compression spring is sleeved on the positioning column, and a lower end surface of the shielding block comprises an arc-shaped groove that is fitted with an optical fiber connector joint.

2. The optical fiber adapter of claim 1, wherein
an upper end of the long groove comprises a positioning groove, and an upper end of the compression spring is inserted into the positioning groove.

3. The optical fiber adapter of claim 1, wherein
two shielding gates are provided;
the two shielding gates are disposed at the lower port of the adapter body, and the two shielding gates are elastically hinged to the one side wall of the adapter body comprising the long groove and one side wall of the adapter body opposite to the one side wall of the adapter body comprising the long groove, one end of one of the two shielding gates facing away from the lower port of the adapter body overlaps with one end of another one of the two shielding gates facing away from the lower port of the adapter body so that an overlapping portion is formed, and one end surface of the overlapping portion is located on a side where the one side wall of the adapter body comprising the long groove is located.

4. The optical fiber adapter of claim 3, wherein
a slideway is provided between the long groove and the sleeve, and the elastic shield is slidably fitted with the slideway along a length direction of the long groove.

5. The optical fiber adapter of claim 4, wherein
the elastic shield comprises a shielding block and a compression spring, a positioning column is provided between two adjacent side walls of the shielding block, a lower end of the compression spring is sleeved on the positioning column, and a lower end surface of the shielding block comprises an arc-shaped groove that is fitted with an optical fiber connector joint.

6. The optical fiber adapter of claim 3, wherein
an inner side surface of a lower end of the elastic shield is protrudingly provided with a flange that is fitted with a lower bottom surface of the overlapping portion of the two shielding gates, and the elastic shield is capable of driving the two shielding gates to slide through the flange.

7. The optical fiber adapter of claim 6, wherein
the elastic shield comprises a shielding block and a compression spring, a positioning column is provided between two adjacent side walls of the shielding block, a lower end of the compression spring is sleeved on the positioning column, and a lower end surface of the shielding block comprises an arc-shaped groove that is fitted with an optical fiber connector joint.

8. The optical fiber adapter of claim 3, wherein
the elastic shield comprises a limiting torsion spring and a shielding arm, and the one side wall at the lower end portion of the adapter body provided comprising the long groove further comprises an accommodation groove for accommodating the limiting torsion spring; and
one end of the limiting torsion spring is elastically hinged to one side wall of the long groove, another end of the limiting torsion spring abuts against the shielding arm, one end of the shielding arm is hinged to a bottom of the accommodation groove, and another end of the shielding arm abuts against another side wall of the long groove.

9. The optical fiber adapter of claim 8, wherein
an inner side surface of the elastic shield is slidably fitted with the one end surface of the overlapping portion of the two shielding gates.

10. The optical fiber adapter of claim 8, wherein
the one side wall at the lower end portion of the adapter body provided with the long groove and a lower end of the one side wall of the adapter body opposite to the one side wall of the adapter body provided with the long groove are respectively horizontally penetrated so that a clamping slot is formed, the clamping slot is clamped to a hinge shaft of each of the two shielding gates, and a torsion spring is sleeved on a middle of the hinge shaft of the each of the two shielding gates.

11. The optical fiber adapter of claim 3, wherein
the one side wall at the lower end portion of the adapter body comprising the long groove and a lower end of the one side wall of the adapter body opposite to the one side wall of the adapter body comprising the long groove are respectively horizontally penetrated so that a clamping slot is formed, the damping slot is clamped to a hinge shaft of each of the two shielding gates, and a torsion spring is sleeved on a middle of the hinge shaft of the each of the two shielding gates.

12. The optical fiber adapter of claim 11, wherein
the damping slot comprises a clamping position and a clamping position entrance portion connected to the damping position in a penetrating manner, and a spacing of the clamping position entrance portion is less than an inner diameter of the clamping position.

13. The optical fiber adapter of claim 3, wherein
the elastic shield comprises a shielding block and a compression spring, a positioning column is provided between two adjacent side walls of the shielding block, a lower end of the compression spring is sleeved on the positioning column, and a lower end surface of the shielding block comprises an arc-shaped groove that is fitted with an optical fiber connector joint.

14. An optical fiber adapter, comprising an adapter body, two shielding gates, a sleeve, and an elastic shield, wherein
one side wall of the adapter body comprises a long groove;
the two shielding gates are disposed at a lower port of the adapter body, and the two shielding gates are elastically hinged to the one side wall of the adapter body comprising the long groove and one side wall of the adapter body opposite to the one side wall of the adapter body comprising the long groove, one end of one of the two shielding gates facing away from the lower port of the adapter body overlaps with one end of another one of the two shielding gates facing away from the lower port of the adapter body so that an overlapping portion is formed, and one end surface of the overlapping portion is located on a side where the one side wall of the adapter body comprising the long groove is located;
the sleeve is sleeved on a periphery of a lower end portion of the adapter body; and
the elastic shield is disposed in the long groove, and the elastic shield is fitted with one end portion of the two shielding gates facing toward the elastic shield,
wherein the two shielding gates, the sleeve, and the elastic shield form an anti-light-leakage cavity on an optical fiber access side of the optical fiber adapter.

15. The optical fiber adapter of claim 14, wherein
an inner side surface of a lower end of the elastic shield includes a protruding flange that is fitted with a lower bottom surface of the overlapping portion of the two shielding gates, and the elastic shield is configured to drive the two shielding gates to slide through the flange.

16. The optical fiber adapter of claim 14, wherein
the elastic shield comprises a limiting torsion spring and a shielding arm, and the one side wall at the lower end portion of the adapter body comprising the long groove further includes an accommodation groove for accommodating the limiting torsion spring; and
one end of the limiting torsion spring is elastically hinged to one side wall of the long groove, another end of the limiting torsion spring abuts against the shielding arm, one end of the shielding arm is hinged to a bottom of the accommodation groove, and another end of the shielding arm abuts against another side wall of the long groove.

17. The optical fiber adapter of claim 14, wherein
a slideway is provided between the long groove and the sleeve, and the elastic shield is slidably fitted with the slideway along a length direction of the long groove.

18. The optical fiber adapter of claim 14, wherein
the one side wall at the lower end portion of the adapter body comprising the long groove and a lower end of the one side wall of the adapter body opposite to the one side wall of the adapter body comprising the long groove are respectively horizontally penetrated such that a clamping slot is formed, the clamping slot is clamped to a hinge shaft of each of the two shielding gates, and a torsion spring is sleeved on a middle of the hinge shaft of the each of the two shielding gates.

19. The optical fiber adapter of claim 14, wherein
the elastic shield comprises a shielding block and a compression spring, a positioning column is provided between two adjacent side walls of the shielding block, a lower end of the compression spring is sleeved on the positioning column, and a lower end surface of the shielding block comprises an arc-shaped groove that is fitted with an optical fiber connector joint.

* * * * *